No. 861,011. PATENTED JULY 23, 1907.
H. G. AHLBERG.
COMBINATION TOOL.
APPLICATION FILED AUG. 8, 1906.
2 SHEETS—SHEET 1.
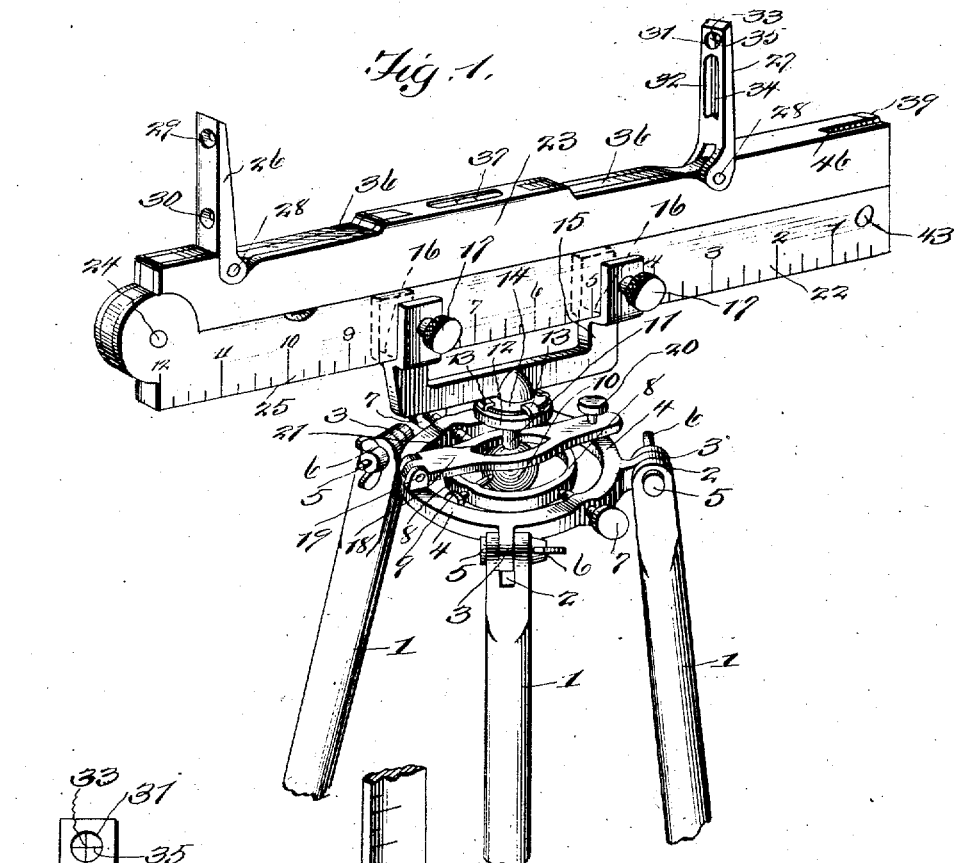
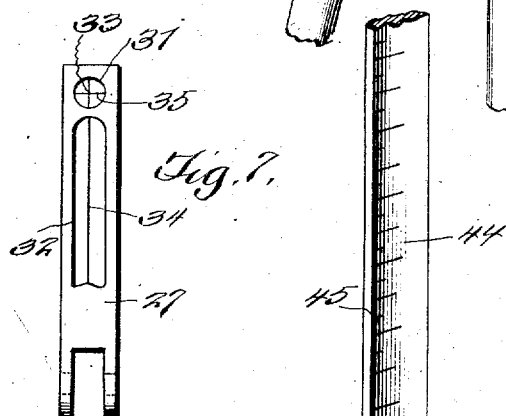
Witnesses
R. A. Boswell.
M. E. Moore.
Inventor
Herman G. Ahlberg,
By
Attorney No. 861,011. PATENTED JULY 23, 1907.
H. G. AHLBERG.
COMBINATION TOOL.
APPLICATION FILED AUG. 8, 1906.
2 SHEETS—SHEET 2.
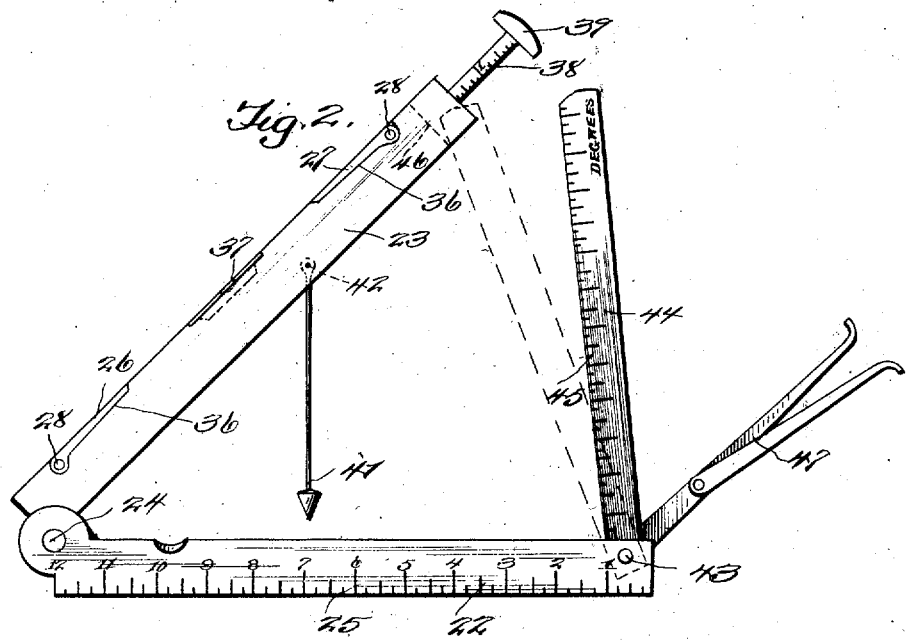
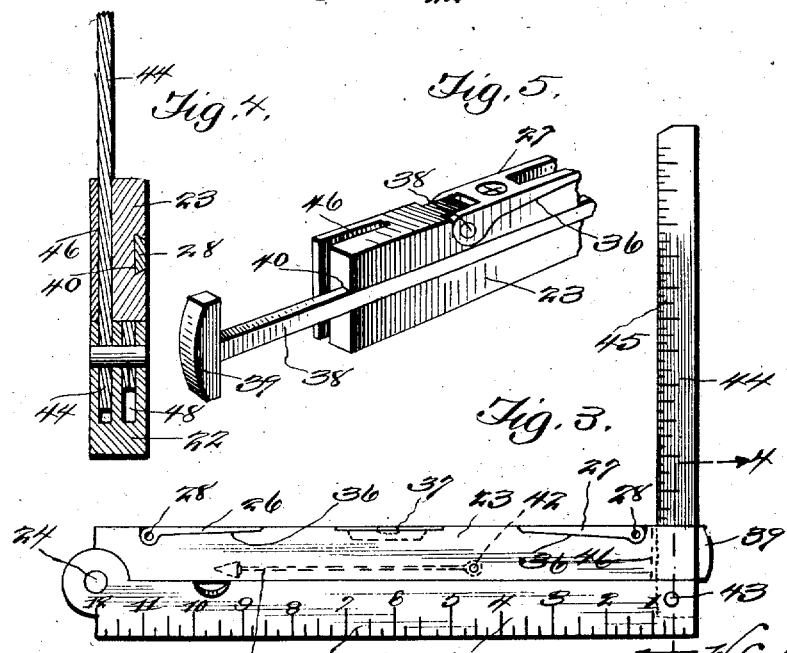
Witnesses
R. A. Boswell.
M. E. Moore.
Inventor
H. G. Ahlberg
By
Moore
Attorney

UNITED STATES PATENT OFFICE.

HERMAN GODTFRED AHLBERG, OF BURLINGTON, IOWA.

COMBINATION-TOOL.

No. 861,011.　　　　　　Specification of Letters Patent.　　　　　Patented July 23, 1907.

Application filed August 3, 1906. Serial No. 329,690.

*To all whom it may concern:*

Be it known that I, HERMAN GODTFRED AHLBERG, a citizen of the United States, residing at Burlington, in the county of Des Moines and State of Iowa, have invented certain new and useful Improvements in Combination-Tools, of which the following is a specification, reference being had therein to the accompanying drawing.

This invention relates to a combination tool or instrument, the object being to provide a device of this character, whereby it may be used as a surveyor's instrument, a carpenter's level, in connection with the plumb bob, a square, an architect's level, and as an ordinary rule, as shown clearly in the accompanying drawings; this device having also in connection with the above set forth features, among others, a pair of calipers, a level glass, a gage extension rule, and hinged sights, when used as a surveyor's instrument, and also graduations and degrees upon the parts necessary so as to adapt the device in practical use, so as to perform the different functions, as indicated above to coincide with the respective professions.

This invention comprises further objects and combinations of elements which will be hereinafter more fully described, shown in the accompanying drawings, and the novel features thereof will be pointed out by the appended claims.

To obtain a full and correct understanding of the details of construction, combinations of features, elements and advantages, reference is to be had to the hereinafter set forth description and the accompanying drawings in connection therewith, wherein Figure 1 is a perspective view showing the device ready for use, as a surveyor's instrument or an architect's level. Fig. 2 is an elevation showing the device, as a carpenter's level, and also displaying the gage extension rule and calipers. Fig. 3 is an elevation showing the device, as a carpenter's square. Fig. 4 is a sectional view on line 4—4 of Fig. 3. Fig. 5 is a fragmental view showing the gage extension rule extended, and recess for receiving the blade, which forms a part of the carpenter's square. Fig. 6 is a detail perspective view, showing more clearly the calipers. Fig. 7 is an elevation of one of the hinged sights, showing more clearly the fine wires disposed at right angles to one another.

Making renewed reference to the accompanying drawings, wherein similar reference characters indicate corresponding parts in the several illustrations, by figures, 1 designates the legs of the tripod, when the combination tool is used in connection therewith as a surveyor's instrument, which legs are bifurcated as shown at 2, to receive the lugs 3, of the ring plate 4, which lugs are securely clamped within said bifurcations, by means of the bolts and winged nuts 5 and 6; this ring plate 4 is provided with thumb screws 7 having conical shaped ends, which are adapted to engage the inner ring plate 8, which also is provided with thumb screws 9, disposed at right angles to the screws 7, which screws 9 also having conical shaped ends engage the spherical shaped ball 10, which is provided with an upwardly extending shank 11, which supports the disk 12, as shown in Fig. 1. These ring plates and thumb screws are provided for the purpose of regulating and insuring the equilibrium of the device when used as an architect's or surveyor's instrument. The disk 12 is provided with a plurality of clamping lugs 13, which clamp the base 14, of the U-shaped member 15, the opposite end portions of which, being bifurcated as at 16 to receive the combination tool, which is securely held therein, by means of the thumb screws 17.

When the combination tool which is carried by the U-shaped member is properly adjusted in the desired position, the clamping elongated plate 18 which is hinged as at 19, securely holds the parts thereof in a rigid and fixed relation, by operating the thumb screw 20, which presses the said plate 18 down upon the ball 10, which will cause the ring plates and thumb screws to frictionally bind; the plate 18 is provided with an elliptical shaped opening 21 to receive the shank 11 of the ball 10, as shown in Fig. 1.

The combination tool comprises a pair of members 22 and 23, hinged together, as at 24, the member 22 being provided with graduations 25, as shown in Figs. 1, 2, and 3 of the drawings, so as to adapt the device as a rule; the member 23, is provided with a pair of sights 26 and 27, which are hinged as at 28, the sight 26 is apertured at 29 and 30, and which apertures are in alinement with the aperture 31, and slot 32, of the sight 27, which aperture 31 and slot 32 are provided with a sighting point 33, formed at the crossing of the two pieces of wire 34 and 35, disposed at right angles to one another, as shown; the member 23 is recessed away as at 36, to receive the sights when closed, so as to render the device comparatively compact in form when not in use, said member 23 is also provided with a level glass 37, so that the device may be used as an ordinary carpenter's or architect's level.

When it is desired to use the device, as a surveyor's instrument, assemble the parts as shown in Fig. 1, then clamp an ordinary compass, between the horizontal portion of the U-shaped member and the member 22 of the combination tool, the pressure of which being sufficient to prevent displacement of said compass, after which proceed with the use of the instrument in the ordinary manner.

When the device is used as an architect's level, the parts are assembled as shown in Fig. 1, but dispensing with the compass, the rule is then set on the corner of the building, after which the procedure is as with an ordinary instrument for this purpose. The member 23 is also provided with a gage extension rule 38 having an enlargement 39, for the purpose of measuring widths and thicknesses, this gage extension rule is received by the recess 40, the walls of which diverge, as shown, so as to prevent lateral or outer displacement of said extension rule. This member 23 carries a plumb bob 41, which is pivoted at 42, as shown in Fig. 2 of the drawings, and when the tool is closed, as shown in Fig. 3 the plumb bob is received within said member 23, as shown in dotted lines.

Pivotally mounted on a pin 43, of the member 22 is a blade 44 having a plurality of graduations of degrees 45, this blade is used to partly form a carpenter's square, as shown in Fig. 3 of the drawings. The member 23 is provided with a recess 46, in the free end thereof, to receive the blade 44 when the said member is closed, as shown in Fig. 3. Also pivotally mounted upon the pin 43, is a pair of hermaphrodite calipers 47, that is, a pair of calipers which may be used either for measuring widths and thicknesses or diameters of openings and performing similar functions, as will be clearly understood from the drawings. The member 22 is recessed longitudinally as shown at 48, to receive the blade 44 and the calipers 47, when the tool is closed as shown in Figs. 1 and 3 of the drawings.

The device when used as a square, the parts of the tool assume the relative positions as shown in Fig. 3 of the drawings; the device may be used as a carpenter's level, by resting the end of the blade in the recess 46 of the member 23 thereby allowing the plumb bob to swing freely outward, thus allowing the device to perform the functions of a carpenter's level, as shown in Fig. 2 of the accompanying drawings. Rises, slopes, or inclinations may be gaged or measured by allowing the parts of the device to approximately assume the positions as shown in Fig. 2, but without employing the plumb bob, then allow the blade 44 to slide through the recess 46 until the desired position is reached by the member 23, after which the number of degrees at the stopping location of the member 23 is read, thus giving the measuring degree of the inclination.

It is to be understood that various changes may be made in the details of construction, combination of features, and elements, without in any way departing from the spirit and scope of the invention covered by the claims thereof; it being also understood that whatever variations are adopted must fall within the scope of the appended claims.

From the foregoing, the essential features, elements and the operation of the device, together with the simplicity thereof, will be clearly apparent, and, when manufactured in accordance with the invention, an inexpensive market will be easily obtained therefor.

Having thus fully described the invention, what is claimed as new and useful by the protection of Letters Patent, is:—

1. In a combination tool, a pair of members pivoted together forming a rule when closed, one of said members being graduated, and having a graduated blade and calipers pivoted at one end thereof, said member having longitudinal recesses to receive said graduated blade and calipers; the other member having a pair of hinged sights and a level glass.

2. In a combination tool, a pair of members pivoted together forming a rule when closed, one of said members being graduated, and having a graduated blade and calipers pivoted at one end thereof, said member having longitudinal recesses to receive said graduated blade and calipers; the other member having a pair of hinged sights and a level glass, said second named member having a pivoted plumb bob, said second named member having a recess to receive said plumb bob when the member is in closed relation with the other member.

3. In a combination tool, a pair of members pivoted together forming a rule when closed, one of said members having a pivoted graduated blade, said member having a longitudinal recess to receive said blade when closed; the other member having a pair of pivoted sights and an extension gage rule, said second named member having a longitudinal recess the walls of which diverge to receive said extension gage rule.

4. In a combination tool, a pair of members pivoted together forming a rule when closed, one of said members having a pivoted graduated blade, said member having a longitudinal recess to receive said blade when closed; the other member having a pair of pivoted sights and an extension gage rule, said second named member having a longitudinal recess the walls of which diverge to receive said extension gage rule, one of said sights having sight apertures; the other sight having a sight aperture and slot, and means within said sight aperture and slot forming a sighting point.

5. In a combination tool a pair of hinged members, one of said members having a pivoted graduated blade and a pair of calipers, said member having a longitudinal recess to receive said blade and calipers; the other member having a pair of hinged sights and an extension gage rule, said second named member having a recess the walls of which diverge to receive said extension gage rule.

6. In a combination tool, a pair of pivoted members, one of said members having a graduated blade and a longitudinal recess to receive said blade; the other pivoted member having a pivoted plumb bob and a recess to receive the same when closed, a pair of hinged sights carried by said second named member, said second named member having recesses to receive said sights, and an extension gage rule carried by said second named member, and means to prevent lateral or outward displacement thereof.

7. In a combination tool, a pair of pivoted members, a graduated blade carried by one of said members, and a recess to receive the same; the other member having an extension gage rule, a longitudinal recess to receive said gage rule, means to prevent lateral or outward displacement thereof, a recess formed in the end of said second named member to receive the graduated blade when the said second named member is closed when the device is used as a carpenter's square.

In testimony whereof I affix my signature in presence of two witnesses.

HERMAN GODTFRED AHLBERG.

Witnesses:
 ALEX. GROSS,
 T. G. HARPER.